Sept. 16, 1941.  J. M. LARSEN  2,256,438
VAPOR AND LIQUID CONTACT APPARATUS
Filed Dec. 14, 1939

INVENTOR
JAMES M. LARSEN
BY
ATTORNEY

Patented Sept. 16, 1941

2,256,438

UNITED STATES PATENT OFFICE 2,256,438

VAPOR AND LIQUID CONTACT APPARATUS

James M. Larsen, Brooklyn, N. Y., assignor to Foster Wheeler Corporation, New York, N. Y., a corporation of New York Application December 14, 1939, Serial No. 309,115

6 Claims. (Cl. 261—114)

This invention relates to vapor and liquid contact apparatus.

The invention provides a novel vapor and liquid contact device of the bubble tray type which is of simple, and easily assembled construction, and which possesses certain advantages over prior types of bubble trays.

The invention will be disclosed as embodied in apparatus for the fractional distillation and rectification of composite liquids, such as hydrocarbon, animal and vegetable oils, but it will be understood that the invention is not limited to such use, but is capable of general application for the intended purpose.

The invention will be understood from the following description considered in connection with the accompanying drawing forming a part thereof and in which.

Like characters of reference refer to the same or to similar parts throughout the several views.

Figure 1:
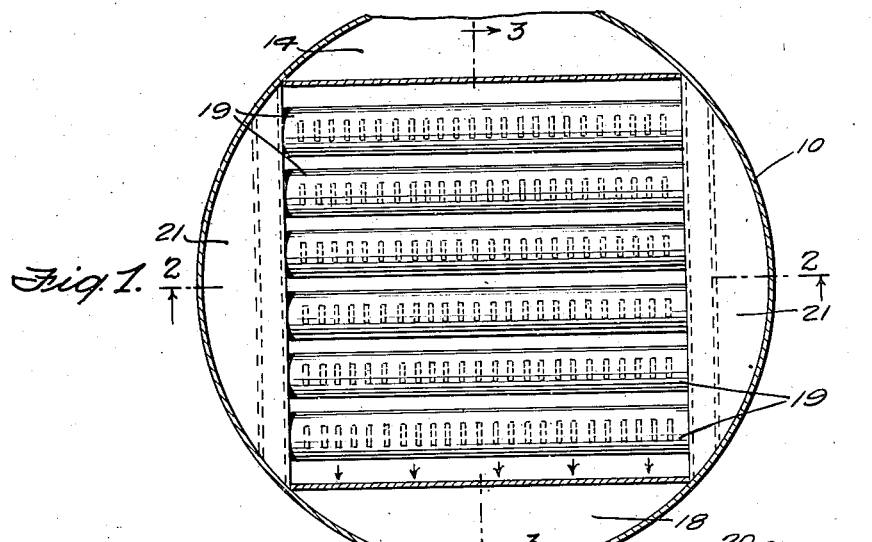
Fig. 1 is a more or less diagrammatic transverse sectional view of a rectifying column having vapor and liquid contact devices embodying the invention.
Figure 2:
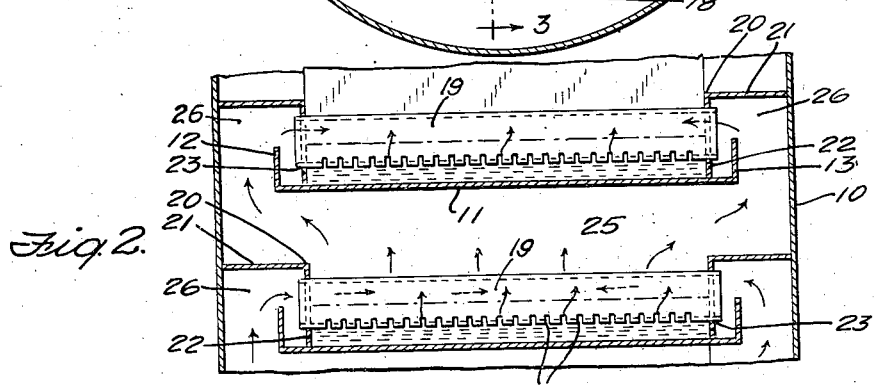
Fig. 2 is a partial longitudinal sectional view taken on line 2—2 of Fig. 1.
Figure 3:
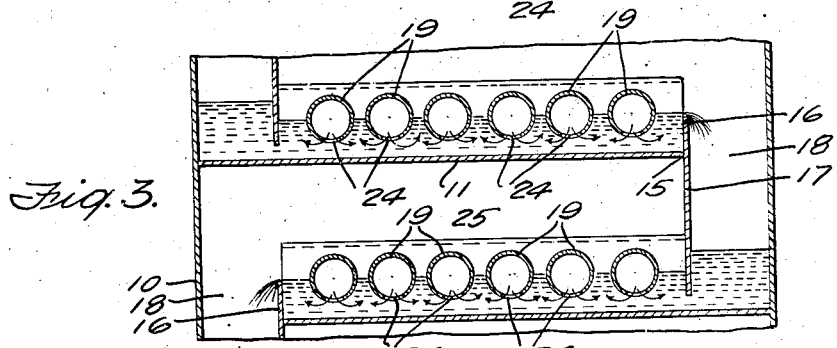
Fig. 3 is a partial longitudinal sectional view taken on line 3—3 of Fig. 1.

Referring to the drawing, particularly Figs. 1 to 3, the rectifying column shown includes a vertical cylindrical shell 10 provided with a plurality of superposed trays 11 having straight parallel upturned sides 12 and 13, a segmental end 14 which snugly fits the inner wall of the shell 10, and an opposite straight end 15 extending normally to the sides 12 and 13. A weir 16 extends across the end 15 of each tray the elevation of which determines the level of the liquid pool on the tray. A vertical plate 17 extends downwardly from the end 15 of each tray to a point just short of the bottom of the tray immediately below, and provides with the shell wall, a down pass 18 for the liquid flowing from one tray over the weir 16, to the tray below. The distance between the lower end of the plate 17 and the bottom of the tray below the plate, determines the rate of flow of the liquid from the liquid receiving portion of the tray to the main body portion thereof. Liquid flows across each tray from end to end in a single straight pass, with the flow on adjacent trays in opposite directions.

Disposed slightly above the bottom of each tray and extending transversely to the direction of flow of liquid thereon as shown, are a plurality of relatively closely spaced, open ended parallel pipes or tubes 19. These tubes extend parallel to the weir 16 as shown, and are supported at their ends by segmental angle plates 20, each of which comprises an upper horizontal portion 21 having a curved outer edge which conforms with the curvature of the inner wall of the shell to which it is secured, and a straight vertically extending portion 22 the lower end of which rests on and is secured to the tray a short distance inwardly of an upturned side. The tubes 19 extend through circular apertures 23 in the portion 22 of the plates 20. Each pipe 19 has a plurality of small, closely spaced slots or orifices 24 distributed along the major portion of its length, which normally are disposed below the surface of the liquid on the tray, or below the elevation of the weir 16. Liquid will not enter the pipes through the orifices 24 because of the vapor pressure therein. All of the trays in the column are alike but alternate trays are reversed in position as shown in the drawing. Any suitable means may be utilized to support the trays in position in the column.

In operation, the vapor enters both ends of the tubes 19 of the lowermost tray in the column above the vapor inlet thereinto and flows through the slots 24 after making a change in flow direction of 90° within each tube 19, and passes upwardly through the liquid on both sides of the tubes. Upon leaving the liquid on the tray, the vapor flows upwardly through the space 25 between the tray and the tray next above and is deflected laterally toward the walls of the column in directions parallel, or substantially parallel, to the axes of the tubes 19 and enters the segmental spaces 26 at the ends of the tubes. In these spaces the vapors are forced to make an abrupt change in their direction of flow of 90° in order to enter the ends of the tubes 19 of the tray above. The vapor flows into the tubes 19 and out through the apertures 24 and bubbles up through the liquid on the tray and thereafter flows upwardly to and through the tubes on the tray above the last mentioned tray after having been forced to alter its direction of flow prior to entering the tubes as previously described, and so on through the other trays and the liquid thereon in the column. The liquid flows between the vertical portions 22 of the plates 20, and the side walls 12 and 13 act as vapor flow directing members to cause the vapor to flow into the upper portion of the spaces 26 so that they will make an abrupt turn of 90° prior to entering the tubes 19.

It will be perceived that with trays embodying the invention, substantially no entrained liquid particles will be carried by the vapor stream from one tray to the liquid on the tray next above, even where the vapor velocity is very high, since the vapor after leaving the liquid on one tray is forced to change its direction of flow and to flow laterally toward and into the spaces 26 wherein the vapor is again forced to change its flow direction prior to flowing into the tubes 19. These changes in flow direction, one of which is abrupt, will eliminate any particles of liquid which might be present in the vapor stream as a result of entrainment.

Figure 4:
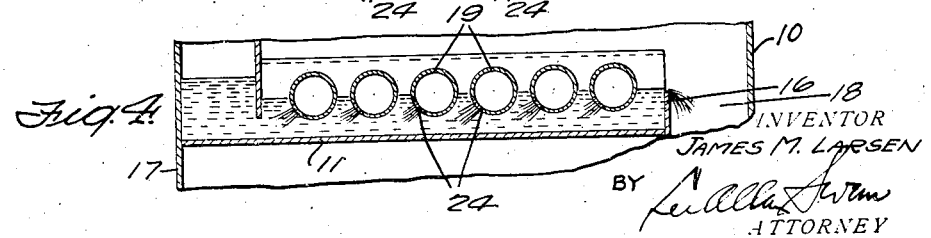
Fig. 4 is a view similar to Fig. 3 showing another form of the invention.

The form of the invention shown in Fig. 4 is like that previously described with the exception that the tubes 19 have their orifices 24 disposed so as to discharge the vapor from the tubes in a horizontally inclined direction and generally toward the liquid inlet end of the tray, or opposite to the flow of liquid across the tray, instead of directly downward, as in Figs. 1 to 3. The flow of the liquid across the tray is thus retarded, which under certain conditions may improve the effectiveness of the liquid and vapor contact. On the other hand, if desired, the orifices 24 in the tubes 19 may be so disposed as to direct the vapor in the direction of flow of the liquid across the tray, thus tending to increase the velocity of flow of the liquid across the tray, which under some conditions might improve the process of rectification.

Vapor and liquid contact apparatus embodying the invention may be utilized in other environments than rectification apparatus. For example, it may be used in vapor generators such as steam generators, for washing steam with fresh feed water.

Since changes may be made in the form, location and relative arrangement of the several parts of the apparatus disclosed without departing from the principles of the invention, it will be understood that the invention is not to be limited excepting by the scope of the appended claims.

What is claimed is:

1. Vapor and liquid contact apparatus comprising a column, a plurality of trays therein disposed in spaced and superposed relationship, each tray having a liquid receiving portion at one end thereof and a weir at the opposite end portion, a substantially horizontal tubular member supported above the tray intermediate the liquid receiving portion and the weir, the tubular member having a vapor inlet opening at each end thereof and a plurality of vapor outlet openings in the wall thereof and disposed at an elevation lower than that of the weir, the arrangement being such that the vapor in flowing upwardly from the liquid on one tray is caused to flow toward each side of the tray immediately above and to make an abrupt change in direction of flow prior to entering the tubular member, whereby liquid entrained in the vapor is removed therefrom before the vapor flows into the tubular member.

2. Vapor and liquid contact apparatus comprising a column, a plurality of trays therein disposed in spaced and superposed relationship, each tray having a liquid receiving portion at one end thereof and a weir at the opposite end portion, a plurality of substantially horizontal, spaced tubular members supported above the tray intermediate the liquid receiving portion and the weir, each tubular member having a vapor inlet opening at each end thereof and a plurality of vapor outlet openings in the wall thereof and disposed at an elevation lower than that of the weir, the arrangement being such that the vapor in flowing upwardly from the liquid on one tray is caused to flow toward each side of the tray immediately above and to make an abrupt change in direction of flow prior to entering the tubular members, whereby liquid entrained in the vapor is removed therefrom before the vapor flows into the tubular members.

3. Vapor and liquid contact apparatus comprising a column, a plurality of trays therein disposed in spaced and superposed relationship, each tray having a liquid receiving portion at one end thereof and a weir at the opposite end portion, a plurality of substantially horizontal, spaced tubular members supported above the tray intermediate the liquid receiving portion and the weir and disposed with their axes substantially parallel to the weir, each tubular member having a vapor inlet opening at each end thereof and a plurality of vapor outlet openings in the wall thereof and disposed at an elevation lower than that of the weir, means extending downwardly from each tray at the weir end thereof toward the liquid receiving portion of the subjacent tray and terminating at an elevation lower than that of the weir on said subjacent tray, the arrangement being such that the vapor in flowing upwardly from the liquid on one tray is caused to flow toward each side of the tray immediately above and to make an abrupt change in direction of flow prior to entering the tubular members, whereby liquid entrained in the vapor is removed therefrom before the vapor flows into the tubular members.

4. Vapor and liquid contact apparatus comprising a tray of substantially rectangular configuration having a liquid receiving portion at one end thereof, a weir extending along the opposite end portion of the tray to maintain a predetermined liquid level on the tray and over which liquid flows after passage across the tray, a substantially horizontally disposed tubular member having its axis substantially parallel to said weir and having a vapor inlet opening at each end thereof and a plurality of vapor outlet openings in the wall thereof, and means for supporting the tubular member above the bottom of the tray at an elevation such that the vapor outlet openings are submerged in the liquid on the tray and said vapor inlet openings are free to receive vapor.

5. Vapor and liquid contact apparatus comprising a tray of substantially rectangular configuration having a liquid receiving portion at one end thereof, a weir extending along the opposite end portion of the tray to maintain a predetermined liquid level on the tray and over which liquid flows after passage across the tray, a substantially horizontally disposed tubular member having a vapor inlet opening at each end thereof and a plurality of vapor outlet openings in the wall thereof, and means for supporting the tubular member above the bottom of the tray at an elevation such that the vapor outlet openings are submerged in the liquid on the tray and said vapor inlet openings are free to receive vapor.

6. Vapor and liquid contact apparatus comprising a tray constructed to provide a reservoir for liquid and having a liquid receiving part at one end portion thereof, an elongated weir extending across the opposite end portion of the tray to maintain a predetermined liquid level on the tray and over which liquid flows after passage across the tray, a substantially horizontally disposed tubular member having its axis substantially parallel to said weir and having a vapor inlet opening at each end thereof and a plurality of vapor outlet openings in the wall thereof, and means for supporting the tubular member above the bottom of the tray at an elevation such that the vapor outlet openings are submerged in the liquid on the tray and said vapor inlet openings are free to receive vapor.

JAMES M. LARSEN.